United States Patent [19]

Anderton

[11] Patent Number: 4,872,267

[45] Date of Patent: Oct. 10, 1989

[54] MEASURING DEVICE

[76] Inventor: Randy Anderton, Route 1 Box 46, Alcester, S. Dak. 57001

[21] Appl. No.: 212,253

[22] Filed: Jun. 27, 1988

[51] Int. Cl.4 ............................................. G01B 5/24
[52] U.S. Cl. ....................................... 33/463; 33/464
[58] Field of Search ................. 33/457, 452, 453, 463, 33/464, 419, DIG. 9

[56] References Cited

U.S. PATENT DOCUMENTS

| | | |
|---|---|---|
| 115,318 | 5/1871 | Hickman . |
| 830,727 | 9/1906 | Long . |
| 1,730,852 | 10/1929 | Jenny . |
| 2,505,149 | 4/1950 | Schoenberg ........................ 33/453 |
| 2,517,264 | 8/1950 | Wake . |
| 3,486,232 | 12/1969 | Klauberg ........................ 33/463 X |
| 4,208,804 | 6/1980 | Lundin . |
| 4,638,569 | 1/1987 | Dove ................................ 33/464 X |

Primary Examiner—Harry N. Haroian
Attorney, Agent, or Firm—Jerry T. Kearns

[57] ABSTRACT

A measuring device is in the form of a triangle with the three legs and associated angles of the triangle being selectively adjustable. Each leg of the triangle is formed by two elongated strips secured in spaced parallel relation. A slot is formed between the pair of strips and receives one strip of each of the two adjacent triangle leg portions. This allows the length of the legs and angles of the triangle to be rapidly adjusted through relative sliding movement of the three leg portions. Each of the three leg portions is provided with a protractor for measuring the respective angle and a linear measuring scale for determining the length of the leg. The main application of the device is to measure all the angles and the lengths of the sides of the triangle with only one setting. By placing each of the three legs on a corner of a triangle all three angle measurements and all three side lenghts may be simultaneously determined. Other functions of the measuring device include making triangles of a certain size, finding the radius of a circle, inscribing an equa-angular triangle in a circle, circumscribing an equa-angular triangle around a circle, bisecting an angle, finding the median of a triangle and finding the altitudes of a triangle.

6 Claims, 3 Drawing Sheets

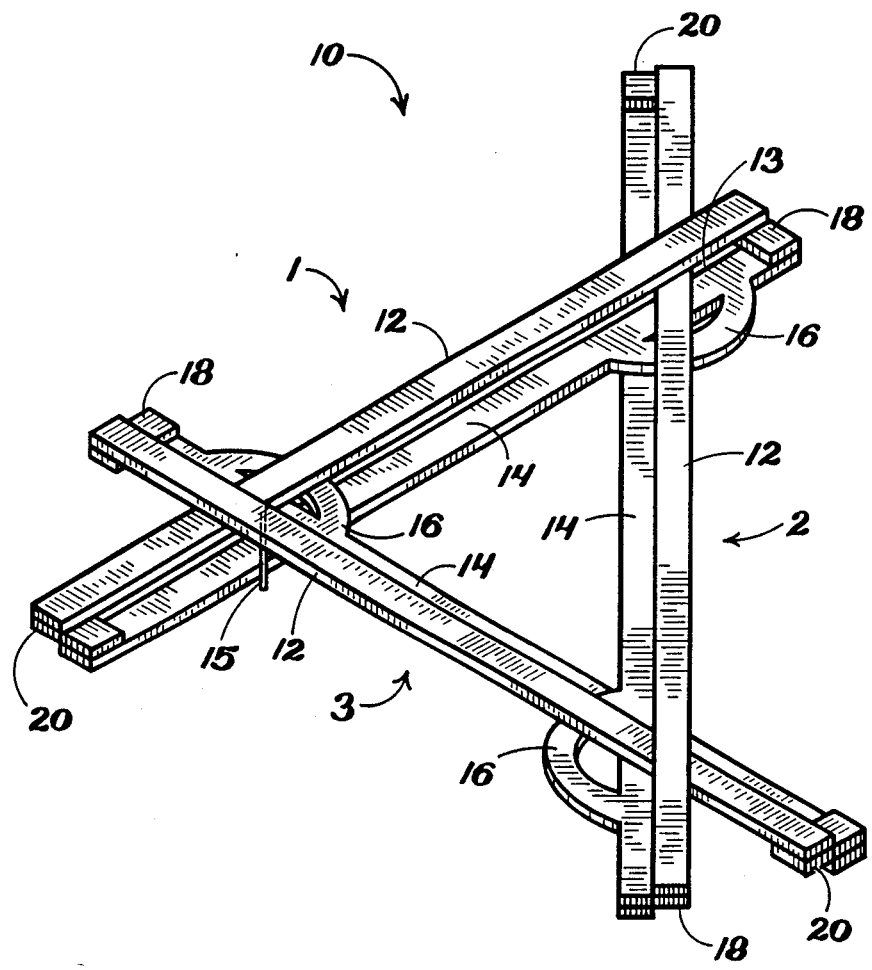

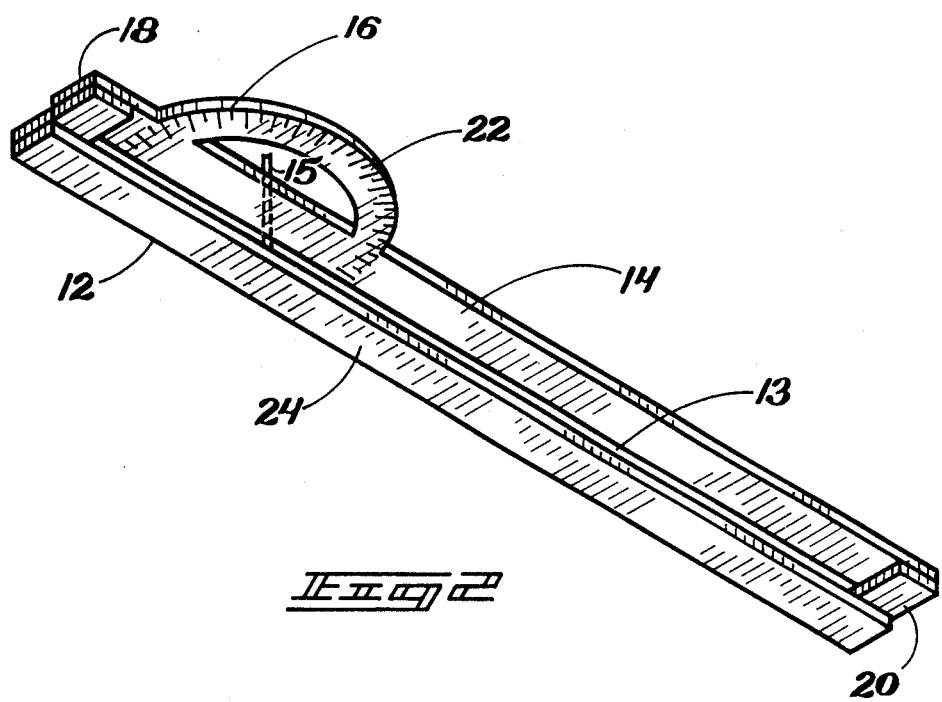
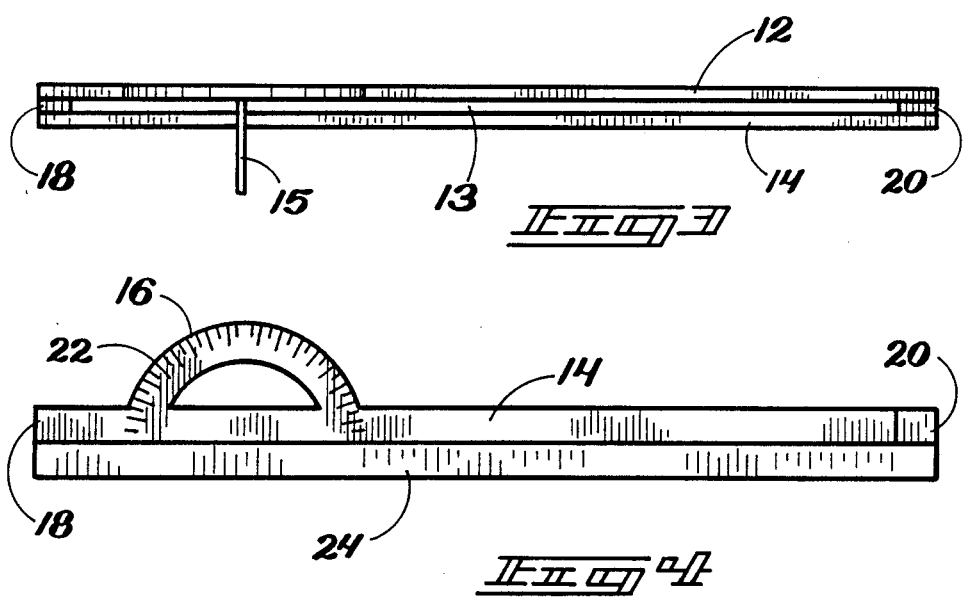

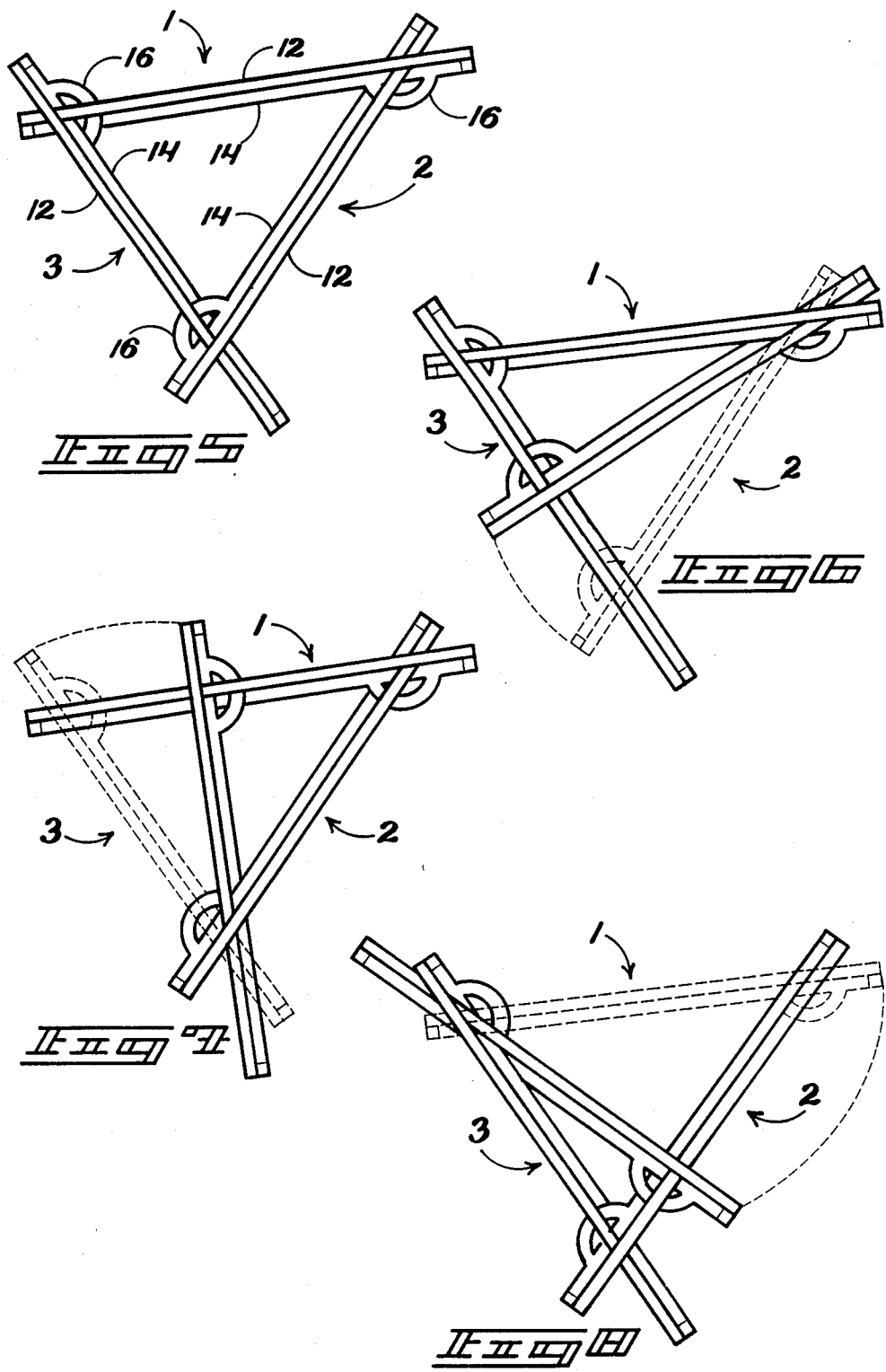

MEASURING DEVICE

BACKGROUND OF THE INVENTION

1. Field of the Invention

The present invention relates to measuring devices, and more particularly pertains to a new and improved measuring device which combines the functions of a plurality of protractors and rulers into a single easily manipulated device. In order to accurately construct or measure triangles before the advent of the present invention, it was necessary to repeatedly manipulate a single ruler and a protractor. Needless to say, this procedure is tedious and time consuming. Additionally, these repeated manipulations introduce errors. In order to overcome these problems and to provide an easily operated measuring instrument for performing a variety of geometrical functions, the present invention provides a triangular measuring device which includes three adjustable legs each provided with a protractor for quickly measuring or constructing a triangle of any desired dimensions.

2. Description of the Prior Art

Various types of measuring devices are known in the prior art. A typical example of such a measuring device is to be found in U.S. Pat. No. 115,318, which issued to E. Hickman on May 30, 1871. This patent discloses a measuring device having a plurality of relatively slidable interconnected linear scales with one of the scales including a protractor. The various linear scales are arranged for measuring various trigonometric functions such as radius, sine, cosine, tangent, cotangent and secant of a geometric figure. U.S. Pat. No. 830,727, which issued to E. Long on Sept. 11, 1906, discloses a combined square, bevel and protractor which utilizes two pivotally connected L-shaped scales, with one of the scales provided with a protractor. U.S. Pat. No. 1,730,852, which issued to W. Jenny on Oct. 8, 1929, discloses a measuring device for measuring the angles and hypotenuse of a triangle. A pair of perpendicular linear scales are provided with a third pivotal leg which is slidably mounted on one of the perpendicular linear scales. A protractor allows the angle of the pivotal leg to be determined. U.S. Pat. No. 2,517,264, which issued to H. Wake on Aug. 1, 1950, discloses a measuring device which utilizes a pair of perpendicular linear scales each provided with a track which slidably receives a protractor for linear adjustment therealong. A pivotal leg is mounted on each protractor. U.S. Pat. No. 4,208,804, which issued to B. Lundin on June 24, 1980, discloses a ruler for dividing a distance into a predetermined number of equal parts. The ruler includes a linear scale with a plurality of numbered scales having a common zero point. A plurality of holes are provided along the ruler for plotting an optional division of an auxiliary distance. The ruler has one end portion mounted in an arcuate track of a protractor.

While the above mentioned devices are suited for their intended usage, none of these devices disclose a measuring device formed in the configuration of a triangle having three relatively slidable legs each provided with a protractor. Inasmuch as the art is relatively crowded with respect to these various types of measuring devices, it can be appreciated that there is a continuing need for and interest in improvements to such measuring devices, and in this respect, the present invention addresses this need and interest.

SUMMARY OF THE INVENTION

In view of the foregoing disadvantages inherent in the known types of measuring devices now present in the prior art, the present invention provides an improved measuring device. As such, the general purpose of the present invention, which will be described subsequently in greater detail, is to provide a new and improved measuring device which has all the advantages of the prior art measuring devices and none of the disadvantages.

To attain this, a representative embodiment of the concepts of the present invention is illustrated in the drawings and makes use of a triangle with the three legs and associated angles of the triangle being selectively adjustable. Each leg of the triangle is formed by two elongated strips secured in spaced parallel relation. A slot is formed between the pair of strips and receives one strip of each of the two adjacent triangle leg portions. This allows the length of the legs and angles of the triangle to be rapidly adjusted through relative sliding movement of the three leg portions. Each of the three leg portions is provided with a protractor for measuring the respective angle and a linear measuring scale for determining the length of the leg. The main application of the device is to measure all the angles and the lengths of the sides of the triangle with only one setting. By placing each of the three legs on a corner of a triangle all three angle measurements and all three side lengths may be simultaneously determined. Other functions of the measuring device include making triangles of a certain size, finding the radius of a circle, inscribing an equa-angular triangle and a circle, circumscribing an equa-angular triangle around a circle, bisecting an angle, finding the median of a triangle and finding the altitudes of a triangle. The measuring device serves to enhance efficiency by allowing measurements which previously required a separate ruler and protractor to be performed with a single measuring instrument.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting. As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved measuring device which has all the advantages of the prior art measuring devices and none of the disadvantages.

It is another object of the present invention to provide a new and improved measuring device which may be easily and efficiently manufactured and marketed.

It is a further object of the present invention to provide a new and improved measuring device which is of a durable and reliable construction.

An even further object of the present invention is to provide a new and improved measuring device which is susceptible of a low cost of manufacture with regard to both materials and labor, and which accordingly is then susceptible of low prices of sale to the consuming public, thereby making such measuring devices economically available to the buying public.

Still yet another object of the present invention is to provide a new and improved measuring device which provides in the apparatuses and methods of the prior art some of the advantages thereof, while simultaneously overcoming some of the disadvantages normally associated therewith.

Still another object of the present invention is to provide a new and improved measuring device which utilizes three interconnected relatively slidable leg portions to enable efficient and accurate construction and measurements of a variety of different sized triangles.

Yet another object of the present invention is to provide a new and improved measuring device which incorporates the functions of a plurality of linear measuring scales and protractors into a single device.

Even still another object of the present invention is to provide a new and improved measuring device which utilizes a triangle formed from three interconnected relatively slidable legs for efficiently finding the angle and side measurements of a triangle, making triangles to a certain size, finding the radius of a circle, inscribing an equa-angular triangle in a circle, circumscribing an equa-angular triangle around a circle, bisecting an angle, finding the median of a triangle and finding the altitudes of a triangle.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a perspective view of the measuring device of the present invention.

FIG. 2 is a perspective view of one leg portion of the measuring device of the present invention.

FIG. 3 is a side view of the leg portion of FIG. 2.

FIG. 4 is a top view of the leg portion of FIG. 2.

FIG. 5 is a diagrammatic illustration of the measuring device of the present invention.

FIG. 6 is a diagrammatic illustration of the adjustability of the measuring device of the present invention.

FIG. 7 is a diagrammatic illustration of the adjustability of the measuring device of the present invention.

FIG. 8 is a diagrammatic illustration of the adjustability of the measuring device of the present invention.

DESCRIPTION OF THE PREFERRED EMBODIMENT

With reference now to the drawings, and in particular to FIG. 1 thereof, a new and improved measuring device embodying the principles and concepts of the present invention and generally designated by the reference numeral 10 will be described.

More specifically, it will be noted that the first embodiment 10 of the invention includes a first leg portion 1, a second leg portion 2, and a third leg portion 3 which are interconnected in a triangular configuration. Each of the three leg portions is formed from a pair of elongated linear strips 12 and 14 which are connected in laterally offset spaced parallel relation by end blocks 18 and 20. Thus, a slot 13 is formed between each pair of strips 12 and 14. One strip 12 or 14 of each of the two adjacent leg portions are received for sliding movement within the slot 13 of each leg portion. For example, the strip 12 of the leg 2 and the strip 14 of the leg 3 are received for sliding movement within the slot 13 of the leg 1. Thus, each of the three legs may be adjusted by relative sliding movement with respect to the two adjacent legs to form a variety of different sizes of triangle having various included angles. A protractor 16 is formed adjacent one end portion of the strip 14 at each of the three legs of the measuring device. This allows the relative included angle between each pair of adjacent legs to be quickly determined. The measuring device 10 of the present invention may be formed from a variety of conventional materials including wood, plastic or metal. An alignment guide pin 15 extends perpendicularly downwardly from the inner edge of each leg 12, at a point opposite the midpoint of the protractor scale 16. The alignment pin 15, shown in FIG. 1, engages the leg 14 and ensures proper alignment with the protractor scale 16. This facilitates rapid use of the instrument.

FIG. 2 provides a perspective illustration of one of the leg portions of the measuring device 10. As each of the three leg portions is similarly constructed, a clear understanding of the construction of the device may be had with reference to FIG. 2. As previously described, each leg portion is formed from two linear parallel elongated strips 12 and 14 which are interconnected in laterally offset spaced parallel relation to form an elongated slot 13 therebetween. End portions of the strip 12 and 14 are secured via connecting end blocks 18 and 20. In the assembly of the measuring device 10 of the present invention, it is to be understood that one of the strips 12 or 14 from each adjacent leg portion will be inserted into the slot 13 before securement of both of the end blocks 18 and 20. The strip 14 has an integrally formed protractor 16 which is imprinted in a conventional fashion with an angular measuring scale 22. An alignment pin 15 extends perpendicularly downwardly from the strip 12, at a point opposite the midpoint on the protractor scale 22. The elongated strip 12 is imprinted in a conventional fashion with a linear measuring scale 24. The scale 24 may be of any conventional increments.

FIG. 3 provides a side view of the leg portion of FIG. 2.

FIG. 4 provides a front view of the leg portion of FIG. 2.

FIG. 5 provides a diagrammatic illustration of the measuring device 10 of the present invention. From an initially adjusted configuration such as that shown in FIG. 5, the measuring device may be relatively adjusted by relative sliding movement of one or more legs of the device.

For example, as shown in FIG. 6, the leg 2 may be adjusted as shown in dotted lines to form a triangle of different dimensions.

Similarly, as shown in FIG. 7, the leg 3 may also be adjusted.

And finally, as shown in FIG. 8, the leg 1 may be adjusted by relative sliding movement as shown in dotted lines.

As will now be readily understood by those of ordinary skill in the art, the measuring device 10 of the present invention is suitable for a wide variety of operations. Example functions of the measuring device of the present invention include finding the angle and side measurements of a wide variety of different triangles, constructing triangles to a predetermined size, finding the radius of circle, inscribing an equa-angular triangle in a circle, circumscribing an equa-angular triangle around a circle, bisecting an angle, finding the median of a triangle and finding the altitudes of a triangle. The measuring device of the present invention can perform any of these applications in much less time than an ordinary ruler and protractor. For individuals working with geometric shapes and measurements, the measuring device of the present invention simplifies measurement and also saves time. For measurements which previously required individual manipulation of a ruler and a protractor, the measuring device of the present invention can perform the same operations in much less time through the use of a single instrument.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A measuring device, comprising:
   three straight leg portions interconnected in a triangular configuration;
   each of said leg portions mounted for linear sliding movement on each two adjacent leg portions;
   each of said leg portions including a pair of elongated strips connected in spaced parallel relation forming a slot therebetween; and
   one strip of each of two adjacent leg portions slidably received in said slot.

2. The measuring device of claim 1, further comprising a protractor on each of said straight leg portions.

3. The measuring device of claim 1, wherein each of said leg portions has a linear measuring scale.

4. The measuring device of claim 1, further comprising an alignment pin extending perpendicularly downwardly on each of said straight leg portions.

5. A measuring device, comprising:
   three straight leg portions interconnected in a triangular configuration;
   each of said leg portions having a pair of elongated strips connected in spaced parallel relation forming a slot therebetween; p1 one strip of each of two adjacent leg portions received for sliding movement in said slot;
   a linear measuring scale on each of said leg portions; and
   a protractor on each of said straight leg portions.

6. The measuring device of claim 5, further comprising an alignment pin extending perpendicularly downwardly on each of said straight leg portions at a point opposite a midpoint of said protractor.

* * * * *